United States Patent [19]

Yeh

[11] Patent Number: 5,915,590
[45] Date of Patent: Jun. 29, 1999

[54] DEVICE FOR SEPARATELY RELEASING BALL BODIES AND COINS

[75] Inventor: Henry Yeh, Taipei Hsien, Taiwan

[73] Assignee: Entrophy International Co., Ltd., Taipei Hsien, Taiwan

[21] Appl. No.: 08/994,640

[22] Filed: Dec. 19, 1997

[51] Int. Cl.⁶ ............................. B65G 59/00; B65H 3/00; G07F 11/16
[52] U.S. Cl. .......................................... 221/258; 221/277
[58] Field of Search .................................. 221/258, 277; 273/378

[56] References Cited

U.S. PATENT DOCUMENTS

| | | | |
|---|---|---|---|
| 5,078,299 | 1/1992 | Keating | 221/258 X |
| 5,097,985 | 3/1992 | Jones | 221/277 X |
| 5,603,429 | 2/1997 | Mulhauser et al. | 221/258 X |
| 5,816,232 | 10/1998 | Bell | 221/258 X |

Primary Examiner—William E. Terrell
Assistant Examiner—Gene D. Crawford
Attorney, Agent, or Firm—Dougherty & Troxell

[57] ABSTRACT

A device for separately releasing ball bodies and coins, including a motor, a base seat, a rotary disc, a driving lever, an outer cover and a shaft. The motor is disposed on rear side of the base seat with the shaft passed through the base seat and fitted into a shaft hole of the rotary disc. The driving lever is inclinedly locked on the base seat to abut against the rotary disc. An upper and a lower edges of the outer cover are formed with arch notches and ball releasing holes. The outer cover is locked on front side of the base seat. An opening of the outer cover is fitted with the collecting funnel. The ball releasing holes are disposed on lower edge of the outer cover and inclinedly arranged along the rotational direction of the motor. The ball bodies and coins going into the outer cover from the collecting funnel are rotarily driven by the rotary disc and separately released from the ball releasing holes and arch notches.

4 Claims, 5 Drawing Sheets 5,915,590

DEVICE FOR SEPARATELY RELEASING BALL BODIES AND COINS

BACKGROUND OF THE INVENTION

The present invention relates to a device for separately releasing ball bodies and coins. The device is applicable to shooting game machine and the like.

In a general shooting game, after the ball bodies are shot out, the ball bodies scatter and drop down. In the case that no collecting measure is used to collect the ball bodies, some of the ball bodies may be wasted. Also, the scattering ball bodies way lead to slipping down of a player or an operator. Therefore, a collecting net is used to collect the ball bodies.

Such collecting net can collect and recover most of the shooting ball bodies therein for further use. However, some of the ball bodies will still drop into the interior of the machine. This often leads to malfunction of the machine. In addition, the collecting net has large volume which occupies much room.

SUMMARY OF THE INVENTION

It is a primary object of the present invention to provide a device which has minimized volume and can separately releasing ball bodies and coins at the same time.

According to the above object, the device of the present invention includes a motor, a base seat, a rotary disc, a driving lever, an outer cover and a shaft. The motor is disposed on rear side of the base seat with the shaft passed through the base seat and fitted into a shaft hole of the rotary disc. The driving lever is inclinedly locked on the base seat to abut against the rotary disc. An upper and a lower edges of the outer cover are formed with arch notches and ball releasing holes. The outer cover is locked on front side of the base seat. An opening of the outer cover is fitted with the collecting funnel. The ball bodies and coins going into the outer cover from the collecting funnel are rotarily driven by the rotary disc and separately released from the ball releasing holes and arch notches.

The present invention can be best understood through the following description and accompanying drawings, wherein:

DETAILED DESCRIPTION OF THE PREFERRED EMBODIMENT

Figure 1:
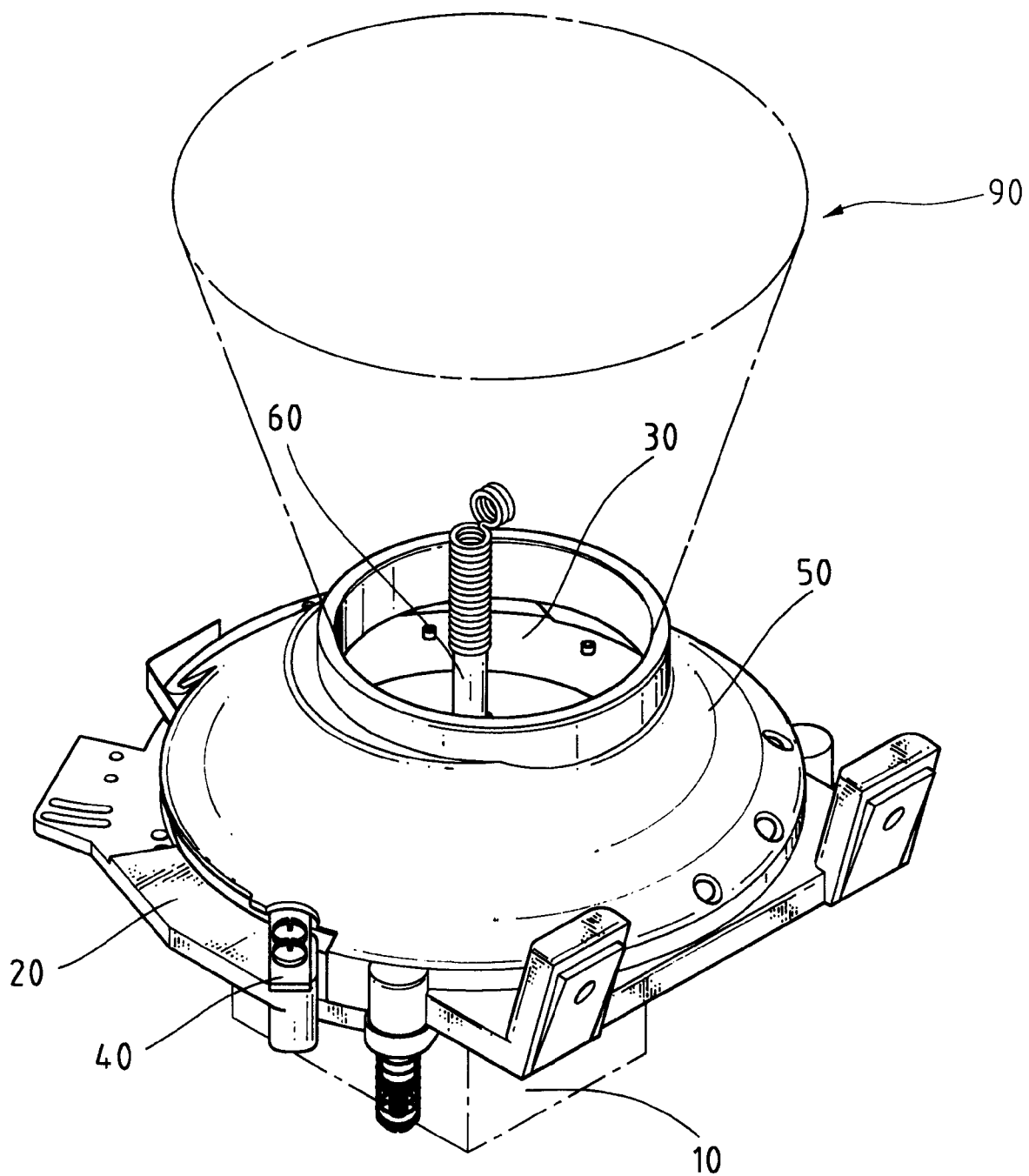
FIG. 1 is a perspective assembled view of the present invention.
Figure 2:
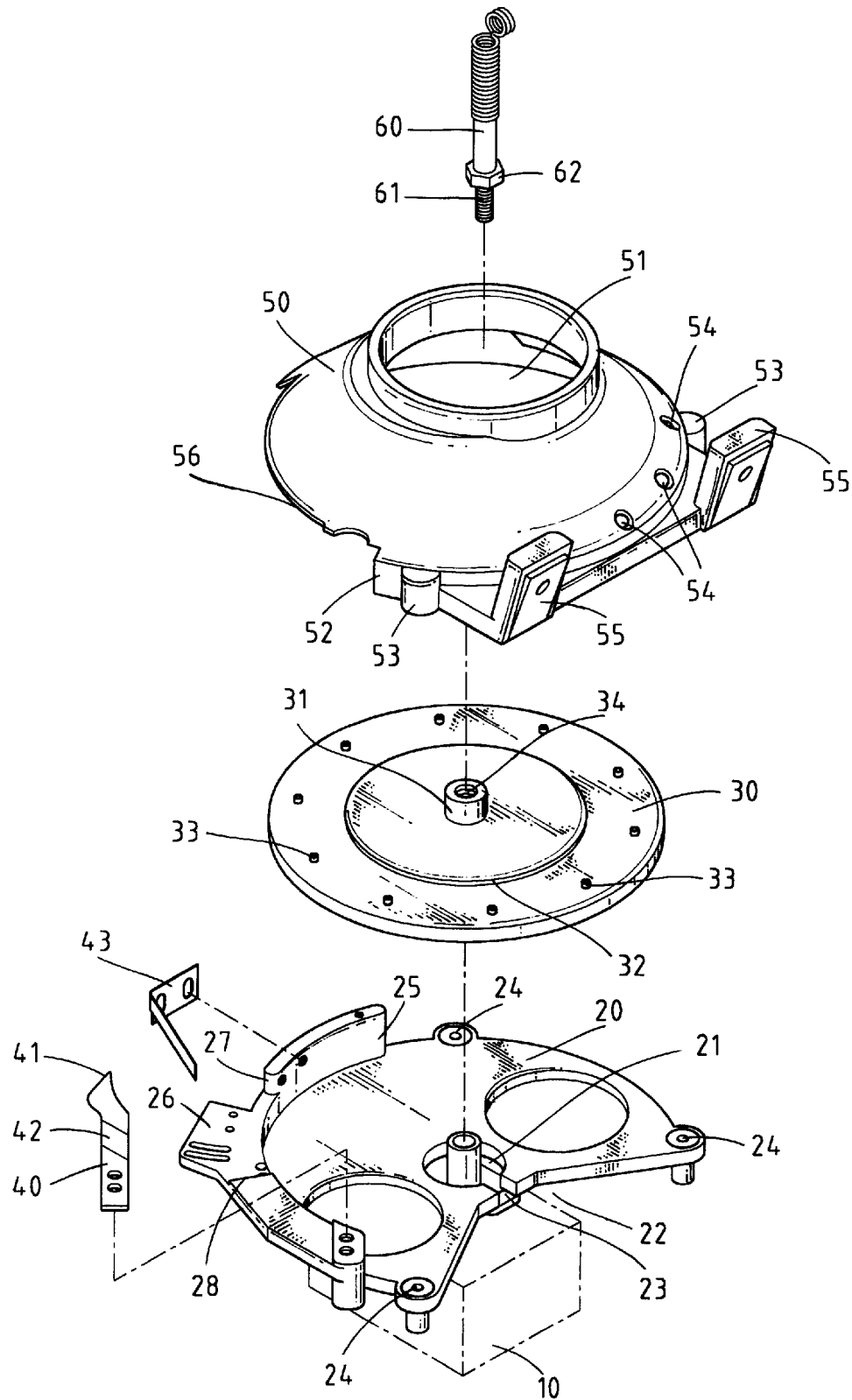
FIG. 2 is a perspective exploded view of the present invention.

Please refer to FIGS. 1 and 2. The present invention includes a motor 10, a base seat 20, a rotary disc 30, a driving lever 40, an outer cover 50 and a shaft 60.

Referring to FIG. 2, the base seat 20 is an irregularly shaped disc body formed with a central shaft hole 21. The lower edge of the disc body is disposed with a sector recess 22 extending to a position in front of the shaft hole 21. A passage 23 is formed between the shaft hole 21 and the recess 22. Two sides of the recess 22 and the periphery of the disc body are formed with thread holes 24. An arch flange 25 extends upward from a position between two thread holes 24 of left upper edge of the disc body. A plate section 26 parallelly outward extends from the center of the arch flange 25. Two lateral sides of the arch flange 25 on two sides of the plate section 26 both upward extend. One lateral side is formed with a projection 27. One side of the projection 27 is transversely formed with several thread holes along outer edge. The other side of the projection 27 is formed with longitudinal thread holes. The other side of the arch flange 25 is formed with stepped shallow dent 28. The end of the arch flange 25 is disposed with thread hole.

The rotary disc 30 is disposed with an upward projecting central shaft hole 31 formed with inner thread 34. An upward projecting concentrical circle is disposed from the shaft hole 31 to about one half of the radius of the rotary disc 30 to define an engaging face 32. The outermost edge of the rotary disc 30 is disposed with short posts 33 at equal intervals. The driving lever 40 is an elongated plate body having a front end formed with a hook-like tip 41. The center of the driving lever is disposed with an inclined projection 42. The end of the driving lever is formed with thread holes.

The outer cover 50 is substantially conically shaped in accordance with the base seat 20. The top of the outer cover is formed with an opening 51. The outer edge of upper end of the opening 51 is disposed with thread holes for locking a collecting funnel. The lower edge of the bottom of the outer cover is disposed with downward projecting arch flange 52 which clockwise extends from right upper side of the bottom to the left lower side. The arch flange 52 is formed with multiple thread hole posts 53 at intervals. Multiple ball releasing holes 54 are formed between two projecting thread hole posts 53 of lower edge of the outer cover 50. The thread hole posts 53 are disposed with downward extending locating blocks 55 with bent sections. The locating block 55 is formed with thread hole. The outer cover 50 is further formed with an arch notch 56 which is counterclockwise sequentially disposed with recesses and projections from right upper side to left lower side. The end is disposed with a small arch recess.

Please refer to FIGS. 1 and 2. The shaft of the motor 10 is first passed through the central shaft hole 21 of the base seat 20. The shaft of the motor 10 is also fitted into the shaft hole 31 of the rotary disc 30. Then the shaft 60 with outer thread 61 and a nut 62 at front end is locked on the rotary disc 30 and tightened by the nut 62. Also, the tip 41 of the driving lever 40 is engaged with the engaging face 32 of the concentrical circle of the rotary disc 30. The other end thereof is locked in the thread hole of the end of the arch flange 25 of the base seat 20. The inclined projection 42 of the driving lever 40 permits the short posts 33 to pass therethrough when the rotary disc 30 is rotated. A stopper plate 43 is locked on a lateral side of the projection 27 of front end of the arch flange 25. The thread hole posts 53 of the outer cover 50 are screwed with the thread holes 24 of the base seat 20 with the arch flange 25 of the base seat 20 positioned at the arch notch 56 of the outer cover 50.

Figure 3:
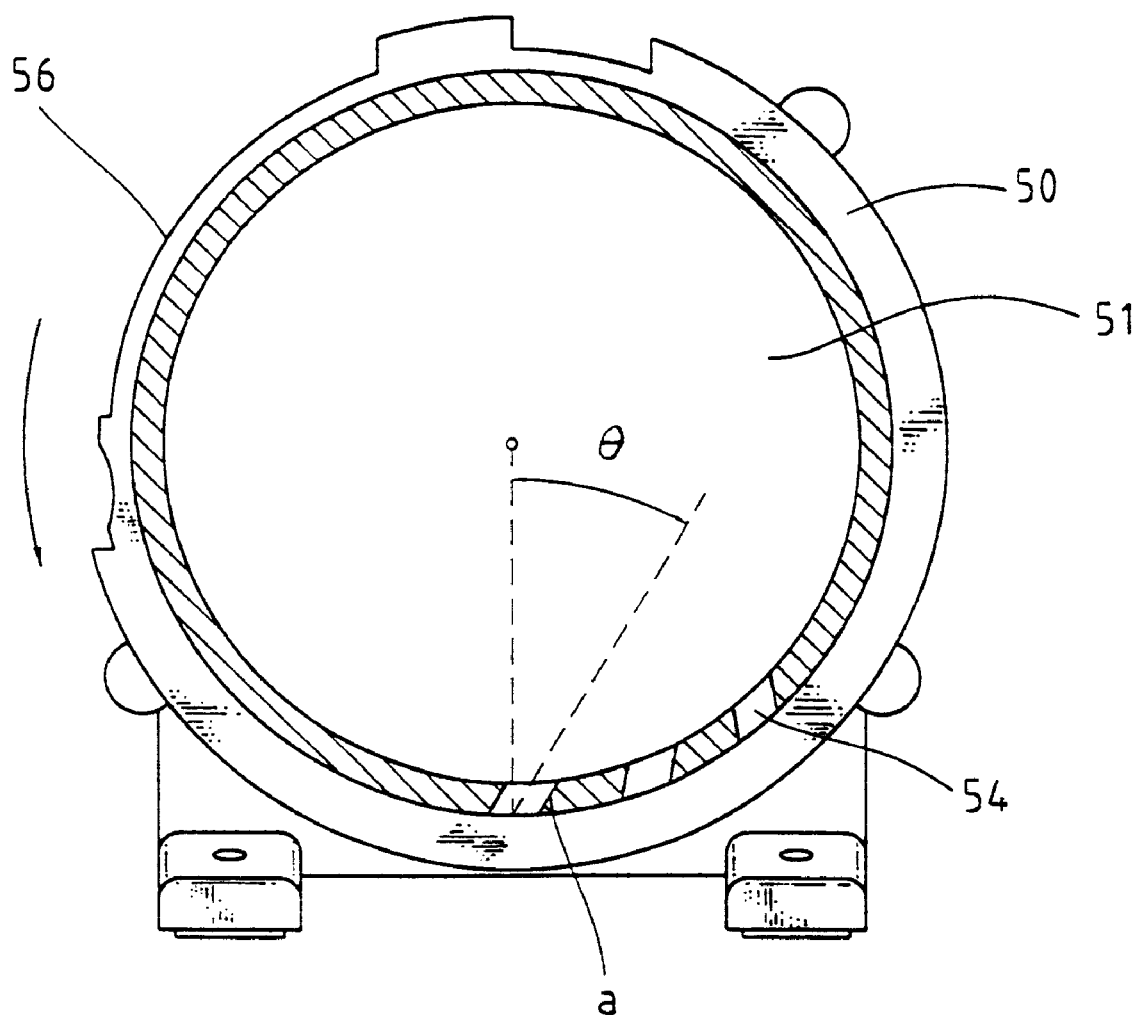
FIG. 3 is a plane view of the present invention.
Figure 4:
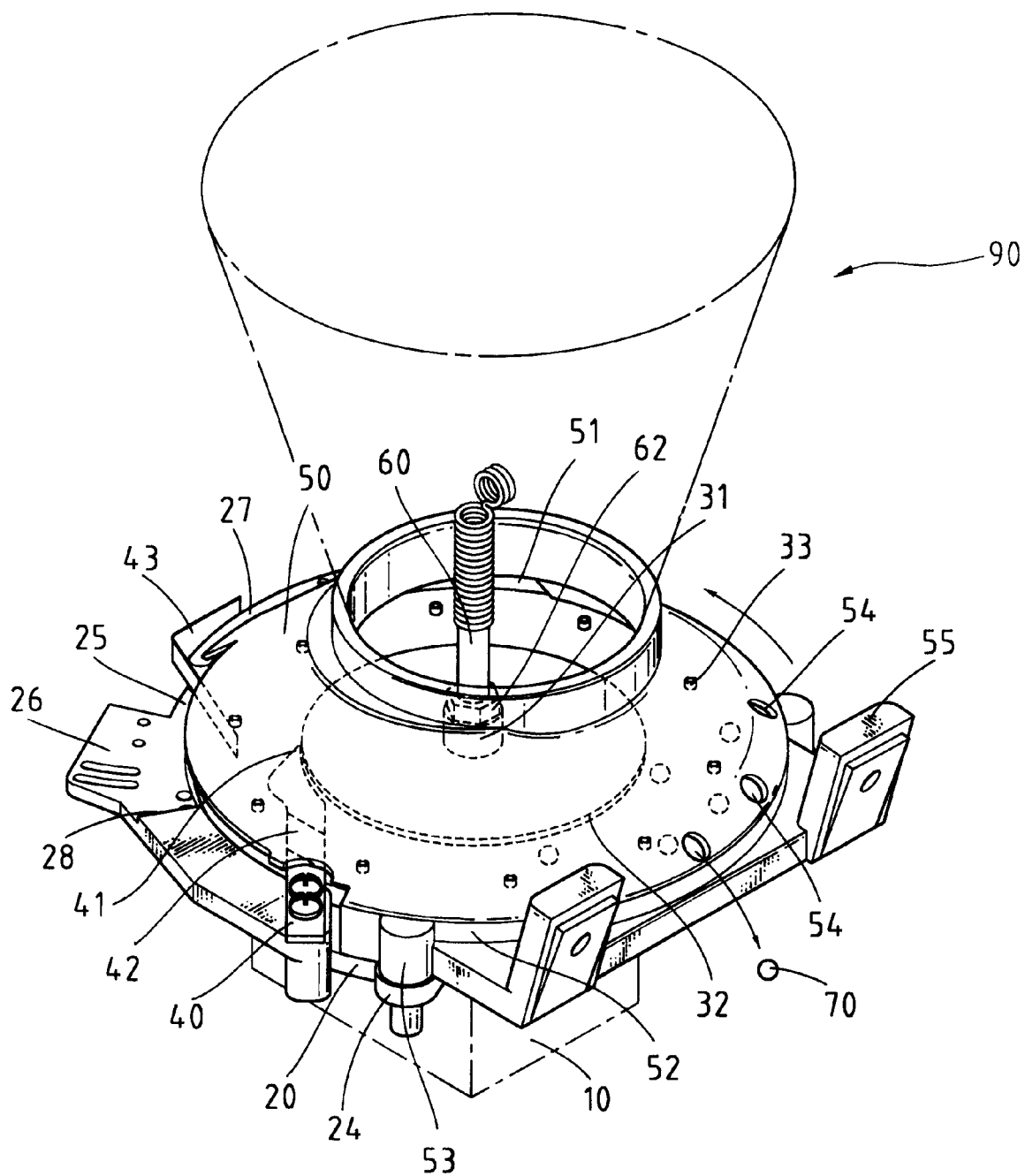
FIG. 4 shows the operation of the present invention in one state.

Referring to FIGS. 3 and 4, when the ball body 70 fails to hit the target, the ball body 70 gets into the outer cover 20 from the collecting funnel. The ball releasing holes 54 are inclinedly formed so that the axial central point thereof and the center of the outer cover 20 contain an angle and the lateral inclined side a of the ball releasing hole 54 is inclinedly tangential to the outer cover 20, whereby the lateral inclined side a and the outer cover 20 contain an obtuse angle. Therefore, when the ball body 70 goes from the lateral inclined side a to be rotarily driven and engaged, the ball body will drop out from the first ball releasing hole 54 of the lower edge of the outer cover 20. In the case that the ball body 70 fails to drop out from the first ball releasing hole 54 in time, the rotary disc 30 will drive the ball body to the second or third ball releasing hole 54 to drop out therefrom. In the case that the ball body still fails to drop out from the third ball releasing hole 54, the ball body 70 will be affected by the gravitational force to fall back to the first ball releasing hole 54. The ball body is then again rotated by the rotary disc 30 and goes through the above procedure until all the ball bodies 70 drop out.

Figure 5:
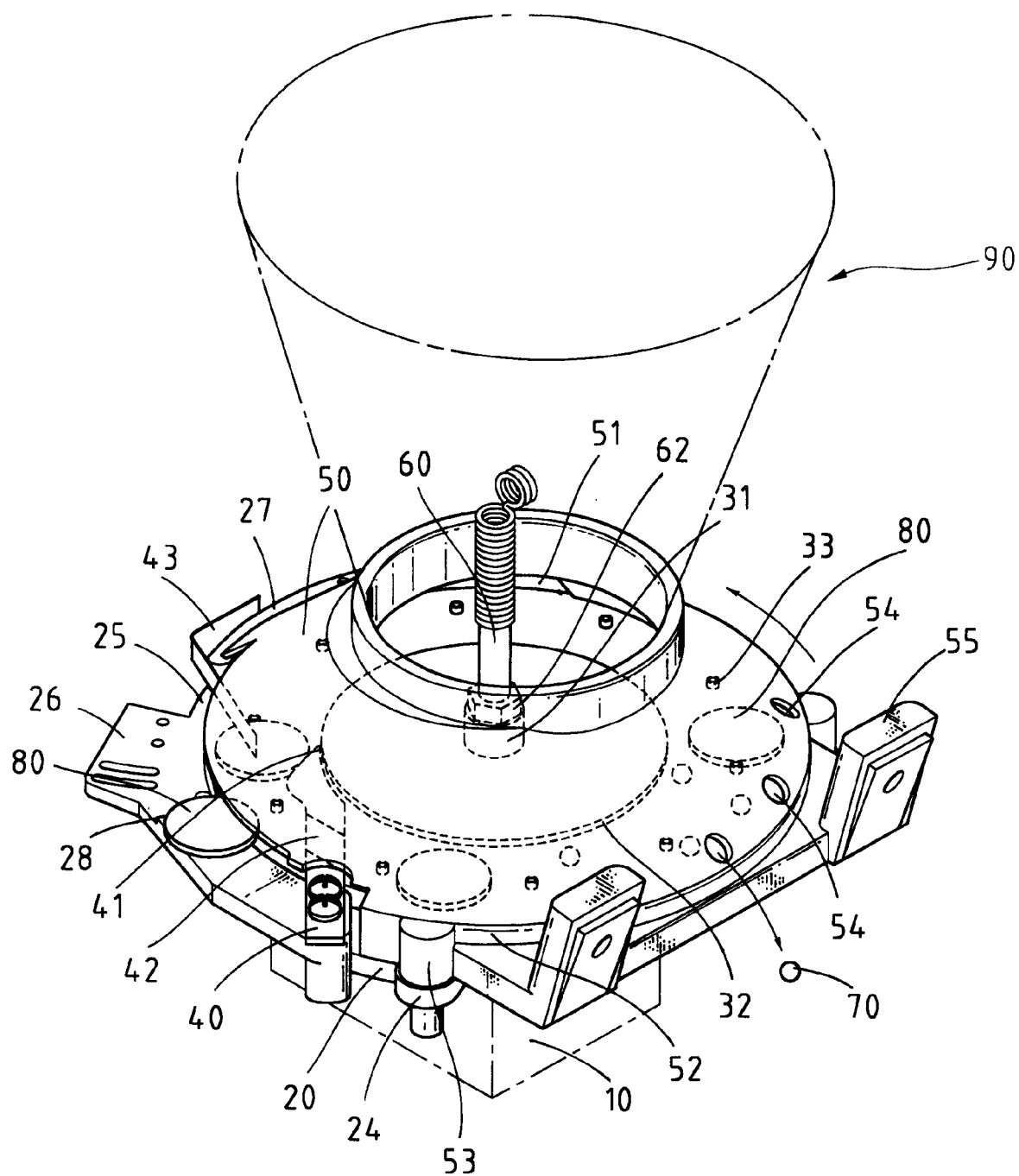
FIG. 5 shows the operation of the present invention in another state.

In the case that the ball body 70 hits the target, the ball body 70 and the coins 80 as a prize will get into the outer cover 20 from the collecting funnel. The ball body 70 goes through the above procedure to drop out from one of the first, second and third ball releasing holes 54. The coins 80 are spaced by the short posts 33 of the rotary disc 30 and moved along with the rotary disc 30. When the coins 80 are moved to the driving lever 40 at upper end, the coins 80 will roll down along the tip 41 of the driving lever 40, whereby the coins 80 and the ball body 70 are separately released as shown in FIG. 5.

The present invention can be widely applied to game machine to separately release the coins and ball bodies, permitting the ball bodies to be recovered for further use.

It should be noted that the above description and accompanying drawings are only used to illustrate one embodiment of the present invention, not intended to limit the scope thereof. Any modification of the embodiment should fall within the scope of the present invention.

What is claimed is:

1. A device for separately releasing ball bodies and coins, comprising a motor, a base seat, a rotary disc, a driving lever, an outer cover and a collecting funnel, the motor being disposed on rear side of the base seat, a shaft of the motor being passed through the base seat and fitted into a shaft hole of the rotary disc, the driving lever being inclinedly locked on the base seat to abut against the rotary disc, upper and lower edges of the outer cover being formed with arch notches and ball releasing holes, the outer cover being locked on front side of the base seat, an opening of the outer cover being fitted with the collecting funnel, the ball releasing holes being disposed on lower edge of the outer cover, whereby the ball bodies and coins going into the outer cover from the collecting funnel are rotarily driven by the rotary disc and separately released from the ball releasing holes and arch notches.

2. A device as claimed in claim 1, wherein in the case that the motor has a clockwise rotational direction, the ball releasing holes of lower edge of the outer cover are disposed within the third quadrant.

3. A device as claimed in claim 1, wherein in the case that the motor has a counterclockwise rotational direction, the ball releasing holes of lower edge of the outer cover are disposed within the fourth quadrant.

4. A device as claimed in claim 2, wherein the ball releasing holes are inclinedly arranged along the rotational direction of the motor and the center of the ball releasing hole and the center of the outer cover contain an angle.

* * * * *